United States Patent [19]
Thorson

[11] 3,916,932
[45] Nov. 4, 1975

[54] FLOW DIVIDER VALVE ASSEMBLY

[75] Inventor: Clayton W. Thorson, Edina, Minn.

[73] Assignee: Eaton Corporation, Cleveland, Ohio

[22] Filed: Mar. 28, 1974

[21] Appl. No.: 455,628

[52] U.S. Cl. ................................ 137/101; 60/422
[51] Int. Cl.² ..................................... G05D 11/03
[58] Field of Search ...................... 137/101; 60/422

[56] References Cited
UNITED STATES PATENTS
3,421,523    1/1969    Davidson ........................... 137/101

Primary Examiner—Robert G. Nilson
Attorney, Agent, or Firm—Teagno & Toddy

[57] ABSTRACT

An improved valve assembly is utilized to divide a flow of fluid between a priority flow utilization device, such as a power steering system, and an excess flow utilization device, such as an auxiliary mechanism. The valve assembly is operable to maintain either one of two predetermined flow rates to the power steering system. The valve assembly includes a housing which defines a chamber in which a valve spool or piston is moved in response to variations in the demand for fluid by the power steering system. The valve spool is provided with two sets of orifices or aperatures which are connected in series with a priority flow outlet through a variable size intermediate opening formed between the end of the valve spool and the housing. During operation of the power steering system, a parallel flow of fluid is conducted at a relatively high rate from the two sets of orifices to the priority flow outlet through the intermediate opening. The rate of fluid flow through the two sets of orifices to the power steering system is maintained constant by shifting the valve spool slightly in response to variations in the pressure differential across the two sets of orifices. When the auxiliary mechanism is being operated, the valve spool is shifted to block one of the two sets of orifices so thaat only a minimum flow of fluid is ported to the power steering system through the other set of orifices. This minimum flow of fluid is maintained substantially constant by varying the size of the intermediate opening in response to variations in the fluid pressure at the priority flow outlet.

8 Claims, 3 Drawing Figures

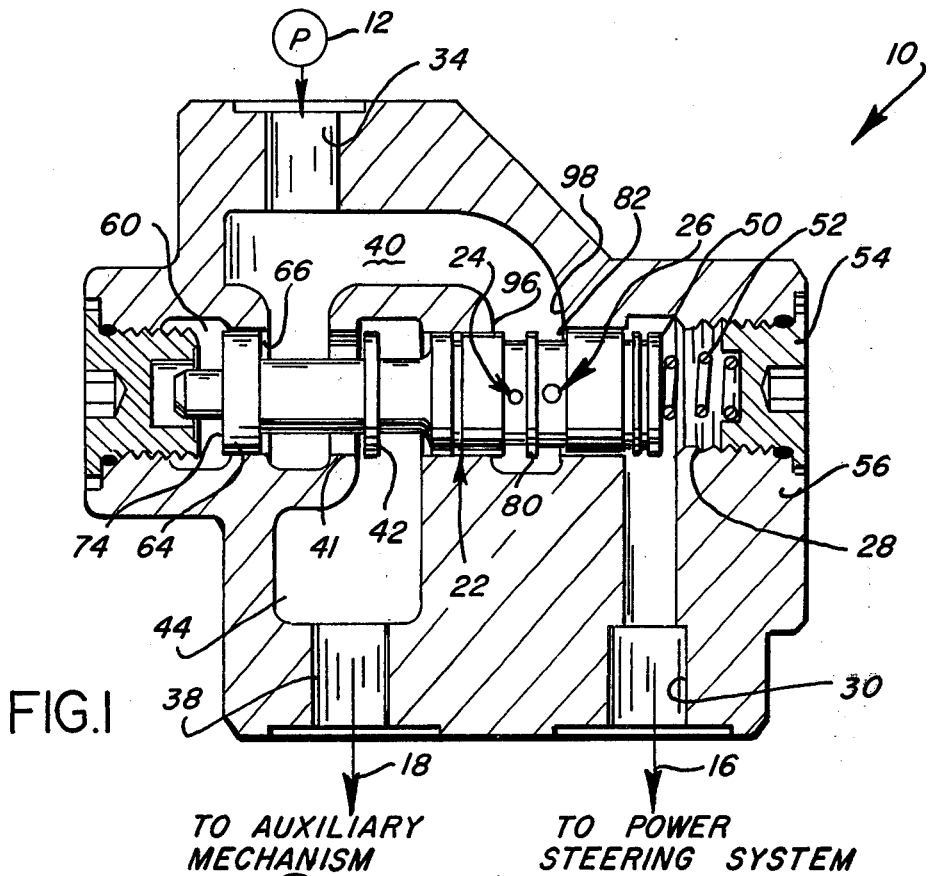
FIG.1 TO AUXILIARY MECHANISM / TO POWER STEERING SYSTEM
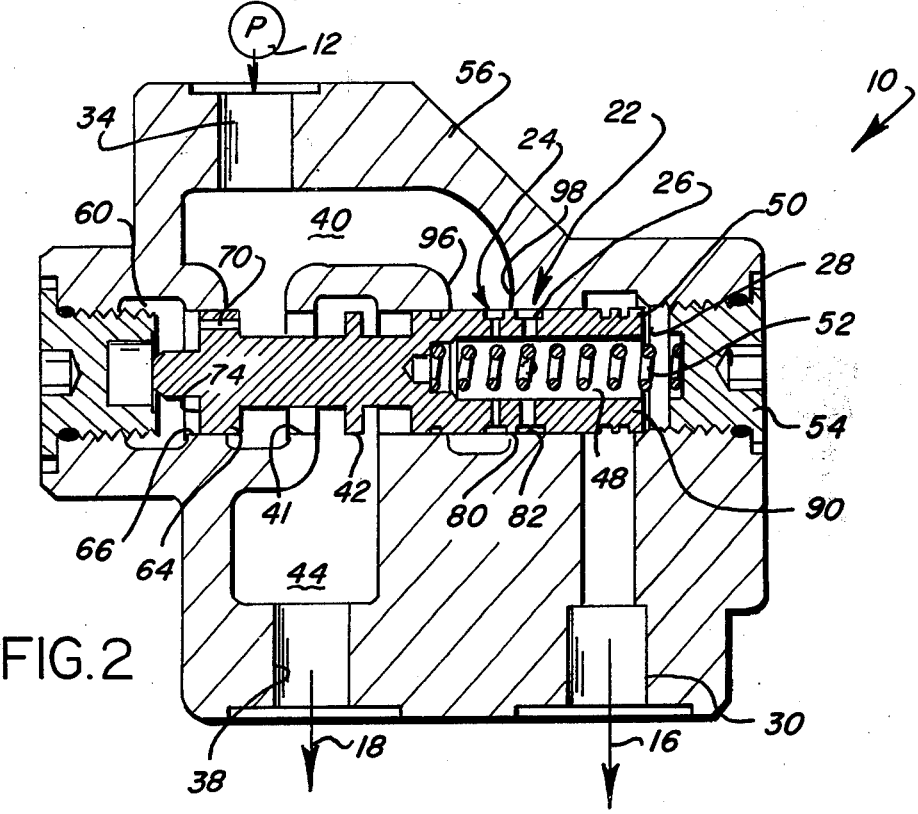
FIG.2

FLOW DIVIDER VALVE ASSEMBLY

BACKGROUND OF THE INVENTION

This invention relates generally to a valve assembly and more specifically to a valve assembly which is utilized to divide a flow of fluid between a priority flow utilization device and an excess flow utilization device.

There are many known valve assemblies which are utilized to divide a flow of fluid between a priority flow utilization device, such as a power steering system, and an excess flow utilization device, such as the hydraulic motor of an auxiliary mechanism associated with a vehicle. One of these known flow divider valve assemblies includes a piston of valve spool having an axially extending internal chamber which is connected with an inlet passage by an orifice or aperture in the wall of the valve spool. The central chamber is open at one end of the valve spool to enable fluid to flow from the chamber to a priority flow outlet passage.

During operation of the power steering system, the open end of the chamber is unrestricted so that fluid can flow freely from the chamber to a priority flow outlet. At this time, the rate of fluid flow is determined by only the size of the orifice in the wall of the valve spool. When the auxiliary mechanism is active, the valve spool is shifted to move the open end of the chamber in the valve spool into a telescopic relationship with a projection on a modulating plug to add an additional orifice which reduces fluid flow to the priority flow outlet.

Although this known flow divider valve construction is generally satisfactory in operation, the cost of producing the parts of this known valve is relatively high due to the extremely small clearance between the external surface of the projection on the flow modulating plug and the internal surface of the valve spool. In addition, this known valve requires selective assembly and adjustment of the parts. The known valve cannot be readily repaired in the field.

In an effort to overcome the difficulties which result from the construction of the aforementioned valve assembly, different types of valve assemblies have been designed. Some of these known valve assemblies are disclosed in U.S. Pat. Nos. 2,995,141; 3,114,380; 3,125,110; and Re. 24,892. Although these known valve assemblies have been more or less satisfactory in their operation and have, to a greater or lesser extent, overcome one or more of the difficulties set forth above, it is believed that these known valve assemblies do not represent an optimum combination of satisfactory operating characteristics and minimum production costs.

SUMMARY OF THE PRESENT INVENTION

The present invention provides an improved valve assembly which is utilized to divide a flow of fluid between a priority flow outlet and an excess flow outlet. During operation of a priority flow utilization device, such as a power steering system, the rate of fluid flow to the priority flow outlet is maintained constant at a relatively large predetermined operating flow rate. When the excess flow utilization device is active, the rate of fluid flow to the priority flow outlet is reduced to a minimum flow rate and is maintained substantially constant at the minimum flow rate.

During operation of the priority flow utilization device, fluid from the inlet passage flows through two sets of orifices or apertures which are disposed in a valve spool in a parallel flow relationship. This parallel flow of fluid is conducted to the priority flow outlet. The rate of fluid flow to the priority flow outlet is maintained substantially constant at the predetermined operating flow rate by maintaining a substantially constant pressure differential across the two sets of orifices. To maintain the constant pressure differential and operating flow rate, the valve spool is shifted or moved slightly in response to variations in the fluid pressure at the priority flow outlet relative to the fluid pressure at the inlet passage.

When the excess flow utilization device is being operated, one of the sets of orifices is blocked and the predetermined minimum flow of fluid is conducted from the other set of orifices to the priority flow device to maintain it in a charged condition. The rate of fluid flow to the priority flow outlet is maintained substantially constant at the predetermined minimum flow rate by maintaining a substantially constant pressure differential across the open set of orifices. This is accomplished by shifting the valve spool slightly to vary the size of an opening between the end of the valve spool and the valve housing in response to variations in the fluid pressure at the priority flow outlet relative to the fluid pressure at the inlet passage. At this time the majority of the flow from the inlet passage is conducted to the excess flow outlet.

Accordingly, it is an object of this invention to provide a new and improved valve assembly which is economical to construct and reliable in operation and which is capable of maintaining a substantially constant and relatively high predetermined rate of fluid flow to a priority flow outlet during operation of a priority flow utilization device and is effective to maintain a substantially constant reduced rate of fluid flow to the priority flow utilization device during operation of an excess flow utilization device.

Another object of this invention is to provide a new and improved flow divider valve assembly having a valve spool with two sets of orifices which port a relatively large parallel flow of fluid to a priority flow outlet during operation of a priority flow device and which port a minimum flow of fluid through one set of the orifices to the priority flow outlet when an excess flow utilization device is active.

BRIEF DESCRIPTION OF THE DRAWINGS

The foregoing and other objects and features of the present invention will become more apparent upon a consideration of the following description taken in connection with the accompanying drawings wherein:

FIG. 1 is a sectional view of a valve assembly constructed in accordance with the present invention, the valve assembly being shown in a condition in which fluid flow to a power steering system is maximized and fluid flow to an auxiliary mechanism is minimized;

FIG. 2 is a sectional view of the valve assembly in FIG. 1 illustrating the valve assembly in a condition in which there is a minimum flow of fluid to the inactive power steering system and in which there is a substantially unrestricted flow of fluid to the auxiliary mechanism.

BRIEF DESCRIPTION OF SPECIFIC PREFERRED EMBODIMENTS OF THE INVENTION

Figure 3:
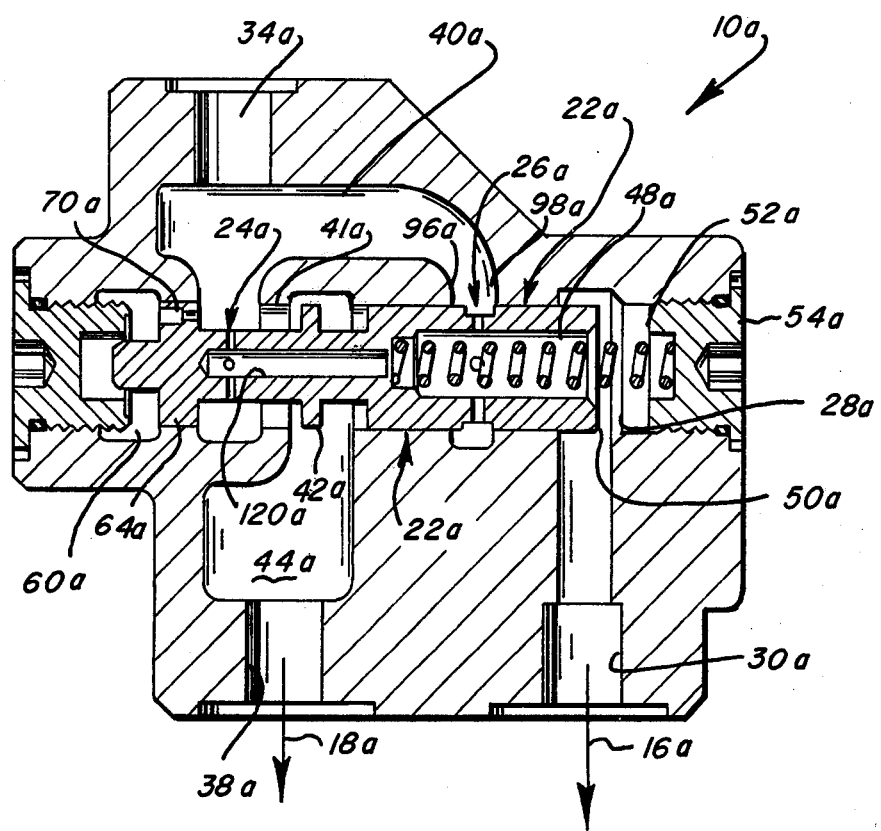
FIG. 3 is a sectional view of a second embodiment of the invention.

A flow divider valve assembly 10 constructed in accordance with the present invention is illustrated in FIG. 1. The valve assembly 10 is operable to divide a fluid flow from a pump 12 between a conduit 16 leading to a power steering system and a conduit 18 leading to an auxiliary power mechanism. When the power steering system is being operated, inlet fluid from the pump 12 is directed to the power steering system at a predetermined operating flow rate which is maintained substantially constant. The inlet fluid which is in excess of the volume of fluid necessary to maintain the predetermined operating flow rate to the power steering system, is directed to the auxiliary mechanism. Whenever the auxiliary mechanism is in an active condition, a predetermined minimum flow is provided to the power steering system and a maximum or normal flow of fluid is provided to the auxiliary mechanism. The minimum flow rate to the power steering mechanism is maintained substantially constant during operation of the auxiliary mechanism.

In accordance with a feature of the present invention, the valve assembly 10 includes a valve spool or piston 22 having two sets of fluid conducting orifices or aperatures in a parallel flow relationship. When the power steering system is being operated, the valve assembly 10 is in the primary operating condition illustrated in FIG. 1 in which there is a predetermined operating flow of fluid to the power steering system. The inlet fluid flows to the power steering system from a minimum flow set of orifices or apertures 24 and a primary set of orifices or apertures 26 in the valve spool 22, through an opening 28, which is variable in response to fluid pressure acting on spool 22, and a priority flow outlet 30.

When the auxiliary mechanism is activated, the valve spool 22 is shifted from the primary operating condition to the position shown in FIG. 2. When the valve spool 22 is in the secondary operating condition, fluid flow through the primary set of orifices 26 is blocked and a predetermined minimum flow of fluid is ported through the set of orifices 24 to the priority outlet 30. The size of the opening 28 is varied in response to variations in the fluid pressures in the conduit 16 and chamber 40 to maintain the rate of flow of fluid to the priority flow outlet 30 substantially constant at the predetermined minimum flow rate.

Thus, the valve spool 22 is shiftable between the primary operating condition of FIG. 1 and the secondary operating condition of FIG. 2 to vary the rate of fluid flow to the power steering system between two different flow rates. In both operating conditions the flow of fluid is modulated or controlled to maintain the rate of fluid flow to the priority outlet 30 substantially constant at the associated one of the predetermined flow rates. In one specific exemplary embodiment of the invention, the valve assembly 10 maintains the flow of fluid to the priority outlet substantially constant at 10 gallons per minute when the valve assembly is in the primary operating condition of FIG. 1. When this specific valve assembly is in the secondary operating condition of FIG. 2, it maintains the rate of fluid flow to the priority outlet 30 constant at a rate of 2 gallons per minute. It should be understood that the foregoing flow rates are set forth merely for purposes of clarity of illustration and the invention is not limited to any specific flow rate or relationship between the two flow rates. This is because the absolute and relative magnitudes of the flow rates in the primary and secondary operating conditions could and probably will differ from these rates due to variations in the number and size of the openings in the two sets of orifices 24 and 26.

The flow from the pump 12 is split between the priority outlet 30 and an excess flow outlet 38. When the valve spool 22 is in the primary operating condition of FIG. 1, the fluid flow in excess of that necessary to maintain a desired relatively large flow rate to the power steering system is conducted to the excess flow outlet 38. This excess fluid is conducted from a valve chamber 40, through a circular opening 41, and past a cylindrical valve land 42 to a chamber 44 connected in fluid communication with the excess flow outlet 38. Similarly, when the valve spool 22 is in the secondary operating condition of FIG. 2, the fluid flow from the pump 12 which is in excess of the relatively small amount necessary to maintain the predetermined minimum flow of fluid to the priority outlet 30 is directed to the excess flow outlet 38.

The specific valve assembly set forth in the aforementioned example has an operating flow rate of 10 gallons per minute to the priority outlet 30 when the valve is in the primary operating condition of FIG. 1. If the pump 12 was operated to supply 20 gallons per minute, the excess flow outlet 38 of this one specific valve assembly would receive 10 gallons of fluid per minute. Similarly, when the valve spool 22 of this one specific valve assembly is in the secondary operating condition of FIG. 2, the rate of fluid flow to the priority flow outlet 26 is 2 gallons per minute. Assuming the same 20 gallon per minute fluid output from the pump 12, the excess flow outlet 38 would receive 18 gallons per minute. Once again it should be understood that the foregoing specific flow rates are for purposes of clarity of illustration only and the invention is not to be limited to these specific flow rates. It is contemplated that the valve assembly 10 will be constructed to provide flow rates other than the specific flow rates set forth herein.

When the valve spool 22 is in the primary operating condition of FIG. 1, a generally cylindrical internal chamber 48 and an annular end face 50 of the valve spool 22 are exposed to the fluid pressure at the priority outlet 30. This fluid pressure urges the valve spool 22 toward the left (as viewed in FIG. 1). In addition, the valve spool 22 is also urged toward the left under the influence of a biasing spring 52 which acts between the valve spool 22 and a threaded plug 54 received in an opening in a valve housing 56.

The valve spool 22 is urged toward the right (as viewed in FIGS. 1 and 2) under the influence of fluid pressure in a chamber 60. The valve spool 22 includes a piston head 64 having a cylindrical outer surface which cooperates with a cylindrical surface 66 on the valve housing 56 to form the pressure chamber 60. The pressure chamber 60 is connected with the inlet valve chamber 40 by a fluid passage 70. Therefore, the fluid pressure in the chamber 60 is substantially the same as the fluid pressure at the inlet 34 when the valve spool 22 is in either the primary operating condition of FIG. 1 or the secondary operating condition of FIG. 2. The pressure in the chamber 60 is applied against the end of spool 22 to urge the valve spool 22 toward the right against the influence of the biasing spring 52 and the fluid pressure against the right end of the valve spool When the valve spool 22 is in the primary operating condition of FIG. 1, variations in the fluid pressure differential across the valve spool cause the valve spool to move through relatively small distances to maintain a substantially constant predetermined operating fluid flow rate to the power steering system. Thus, if the fluid pressure at the priority flow outlet should increase with the valve spool 22 in the primary operating condition of FIG. 1, there is a slight momentary reduction in the pressure drop across the orifices 24 and 26 and a corresponding instantaneous drop in the flow of fluid to the priority flow outlet 30. This instantaneous drop in the fluid flow to the priority outlet 30 is immediately corrected by a slight shifting of the valve spool 22 toward the left as viewed in FIG. 1.

The slight leftward movement of the valve spool 22 decreases the fluid flow to the excess flow outlet 38 and increases the fluid flow to the priority flow outlet 30 back to the desired flow rate. Thus, the increase in fluid pressure against the right end of the valve spool 22 causes the valve spool to shift toward the left (as viewed in FIGS. 1 and 2) against the influence of fluid pressure on the end of valve spool 22. As this occurs, the land 42 moves toward the circular opening 41 to decrease the rate at which fluid flows through the opening and increase the fluid pressure in the inlet chamber 40. This increased fluid pressure in the inlet chamber 40 increases the pressure differential across the two sets of orifices 24 and 26. Of course, the increased fluid pressure differential across the two sets of orifices 24 and 26 increases the parallel flow of fluid through the two sets of orifices to the priority outlet 30 to provide the predetermined operating rate of fluid flow of the power steering system.

If the fluid pressure at the priority flow outlet 30 should happen to decrease slightly when the valve spool 22 is in the primary operating condition of FIG. 1, the fluid pressure differential across the two sets of orifices 24 and 26 is instantaneously increased. This results in an instantaneous increase in the rate of fluid flow to the priority flow outlet 30. However, the valve spool 22 is quickly moved through a small distance to compensate for the slight decrease in fluid pressure at the priority flow outlet 30 and maintain a substantially constant fluid flow rate to the power steering system.

Thus, the slight momentary decrease in fluid pressure at the priority flow outlet 30 enables the fluid pressure in the chamber 60 to move the valve spool 22 slightly toward the right (as viewed in FIGS. 1 and 2) against the influence of the biasing spring 52 and the reduced fluid pressure applied against the right end of the valve 22. As the valve spool moves through a small distance toward the right, the land 42 moves away from the opening 41 to slightly increase the rate of flow to the excess flow outlet 38. This results in a slight reduction in the fluid pressure in the inlet chamber 40. Of course, this results in a decrease in the fluid pressure differential across the two sets of orifices 24 and 26 with a resulting correction of the instantaneous increase in the fluid flow to the priority outlet 30. Thus, the valve spool 22 oscillates or hunts through relatively small distances when it is in the primary operating condition of FIG. 1 to maintain a substantially constant rate of fluid flow to the priority outlet 30 and the power steering system.

When the auxiliary mechanism is activated, the power steering system is in an inactive condition and the fluid pressure at the excess flow outlet 38 increases substantially relative to the fluid pressure at the priority flow outlet 30. This substantial increase in the fluid pressure at the excess flow outlet 38 is transmitted through the passage 70 to the pressure chamber 60. The resulting increase in fluid pressure applied against the end of the valve spool 22 shifts the valve spool 22 toward the right from the primary operating condition of FIG. 1 to the secondary operating condition of FIG. 2.

As the valve spool 22 is shifted toward the right to the secondary operating condition, an annular land 80 on the valve spool 22 moves into sealing engagement with a cylindrical surface 82 of the valve housing 56 to block fluid flow from the inlet 34 to the primary set of orifices 26. When the valve spool 22 is in the secondary condition of FIG. 2, the opening 28 is relatively small. Operating fluid can flow from the inlet opening 34 to the primary outlet 30 through only the secondary set of orifices 24 and the opening 28 when the valve spool 22 is in the secondary operating condition of FIG. 2. The rate of fluid flow is therefore determined at this time by the combined influence of the set of orifices 24 and the opening 28.

If the fluid pressure at the excess flow outlet 38 should increase when the valve spool 22 is in the secondary operating condition of FIG. 2, the increased fluid pressure is transmitted through the opening 42 to the secondary set of orifices 24. This results in an increase in the fluid pressure differential across the secondary set of orifices 24 and opening 28 with a resulting instantaneous increase in the rate of fluid flow to the priority flow outlet 30. However, the increase in fluid pressure at the excess flow outlet 38 is transmitted through the passage 70 to the pressure chamber 60. This increased pressure in the chamber 60 causes the valve spool 22 to shift slightly toward the right from the position shown in FIG. 2. The slight rightward shifting of the valve spool 22 causes the size of the opening 28 to be reduced with a resulting reduction in the rate of fluid flow to the priority outlet 30. Therefore, even though the rate of fluid flow to the priority outlet 30 may be momentarily increased to a rate which is slightly greater than the predetermined minimum flow rate upon an increase in the fluid pressure at the excess flow outlet 38 relative to the fluid pressure at the priority flow outlet 30, this is quickly compensated for by a reduction in the size of the opening 28.

If the fluid pressure at the excess flow outlet 38 should decrease slightly when the valve spool 22 is in the secondary operating condition of FIG. 2, thereby decreasing pressure in chamber 40, the valve spool is shifted slightly toward the left to increase the size of the opening 28 and maintain the predetermined minimum fluid flow rate to the priority flow outlet. Thus, a slight reduction in the fluid pressure at the excess flow outlet 38 is transmitted to the pressure chamber 60 through the passage 70. This results in a reduction in the fluid pressure applied against the end of valve spool 22. As this occurs, the valve spool 22 is shifted toward the left under the influence of the biasing spring 52 and the fluid pressure against the right end of the valve spool. This slight leftward movement of the valve spool 22 increases the size of the opening 28 to quickly return the rate of fluid flow from the inlet 34 to the priority outlet 30 to the predetermined minimum flow rate.

The valve spool 22 oscillates or shifts slightly when it is in the secondary operating condition of FIG. 2 to maintain the fluid flow rate to the priority flow outlet 30 substantially constant at the predetermined minimum flow rate even though the fluid pressure at the excess flow outlet 38 may vary slightly. It should be noted that the passage 70 has a relatively restricted cross sectional area so that it acts as a dashpot to dampen movement of the valve spool 22 in response to transient variations in fluid pressure at the excess flow outlet 38 and priority flow outlet 30.

The primary set of orifices or apertures 26 includes a plurality of radially extending circular holes or openings in a generally cylindrical wall 90 of the valve spool 22. The secondary set of orifices 24 also includes a plurality of radially extending circular holes formed in the wall 90 of the valve spool 22. In the specific preferred embodiment of the invention illustrated in the drawings, the openings forming the primary set of apertures 26 have a substantially greater diameter under the openings forming the secondary set of apertures 24. Therefore, when the valve spool 22 is in the primary operating condition of FIG. 1, the majority of fluid flowing to the power steering system passes through the primary set of aperatures 26 while a relatively small amount of fluid flows through the secondary set of apertures 22. However, it is contemplated that the relative sizes of the openings forming the primary and secondary sets of apertures 24 and 26 could be varied to vary the flow rates obtained when the valve spool 22 is in the primary and secondary operating conditions of FIGS. 1 and 2.

When the valve assembly 10 is in the primary operating condition of FIG. 1, it is necessary for the primary and secondary sets of orifices 24 and 26 to be located in the opening between two surfaces 96 and 98 of the valve housing 56. It is contemplated that when the valve assembly 10 is utilized in certain environments it may be desirable to reduce the distance between the surfaces 96 and 98 to thereby reduce the size of the valve housing 56.

In the embodiment of the invention illustrated in FIG. 3, the secondary set of orifices is spaced from the primary set of orifices so that the opening between the surfaces 96 and 98 of the valve housing need be only large enough to accommodate the primary set of orifices. Since the embodiment of the invention illustrated in FIG. 3 operates in the same manner as the embodiment of the invention illustrated in FIGS. 1 and 2 and is formed of similar components, the components of the embodiment of the valve assembly illustrated in FIG. 3 will be designated by the same numerals as utilized in connection with the embodiment of the invention illustrated in FIGS. 1 and 2, the suffix letter *a* being utilized in association with the numerals of FIG. 3 to avoid confusion.

The valve assembly 10a includes a valve spool 22a having a secondary set of orifices or apertures 24a and a primary set of orifices or apertures 26a. When the valve spool 22a is in the primary operating position of FIG. 3, fluid can flow from an inlet port 34a through both the primary and secondary sets of orifices 24a and 26a to a priority flow outlet 30a. In addition, fluid can flow around a valve land 42a to an excess flow outlet 38a.

Upon activation of an auxiliary mechanism connected with the excess flow outlet 38a, the fluid pressure conducted through a passage 70a to a pressure chamber 60a is increased across the valve spool 22a to shift toward the right (as viewed in FIG. 3) against the influence of a biasing spring 52a and fluid pressure applied against the right end of the valve spool 22a. This rightward shifting movement of the valve spool 22a blocks the primary set of orifices 26a to reduce the rate at which fluid flows to the priority flow outlet 30a in the manner previously explained.

It should be noted that the secondary set of orifices or aperatures 24a is connected in continuous fluid communication with the primary flow outlet 30a through an axially extending central passage 120 in the valve spool 22a, a central valve chamber 48a, and an opening 28a. It is believed that it will be clear that the positioning of the secondary set of orifices 24a between the valve land 42a and piston head 70a maintains it continuously exposed to the fluid pressure in the inlet chamber 40a. This enables the valve assembly 10a to function in the same manner as previously described in connection with the valve assembly 10 of the embodiment of the invention illustrated in FIGS. 1 and 2. However, the distance between interior surfaces 96a and 98a of the housing 56a is less than in the embodiment of the invention illustrated in FIGS. 1 and 2. This is because the space between the surfaces 96a and 98a need only be large enough to accommodate flow to the primary set of orifices 26a when the valve spool 22a is in the primary operating condition of FIG. 3.

In view of the foregoing description, it can be seen that the valve assembly 10 is utilized to divide a flow of fluid between a priority flow outlet 30 and an excess flow outlet 38. During operation of the priority flow utilization device, such as a power steering system, the rate of fluid flow to the priority flow outlet is maintained constant at a relatively large predetermined operating flow rate. When the excess flow utilization device is active, the rate of fluid flow to the priority flow outlet is reduced to a minimum flow rate and is maintained substantially constant at the minimum flow rate.

During operation of the power steering system, fluid from the inlet 34 flows through the primary set of orifices or aperatures 26 and the secondary set of orifices or aperatures 24 in a parallel relationship. The rate of fluid flow to the priority flow outlet 30 is maintained substantially constant at the predetermined operating flow rate by shifting the valve spool 22 slightly in response to variations in the fluid pressure at the priority flow outlet 30 relative to the fluid pressure at the excess flow outlet 38.

When the auxiliary mechanism connected with the excess flow outlet 38 is being utilized, the primary set of priority flow orifices or aperatures 26 is blocked and a predetermined minimum flow of fluid is conducted through the secondary set of orifices 24 and opening 28 to the power steering system to maintain it in a charged condition. The rate of fluid flow to the priority flow outlet 30 is maintained substantially constant at the predetermined minimum flow rate by varying the size of the flow regulating opening 28 in response to variations in the fluid pressure at the excess flow outlet 38 relative to the fluid pressure at the priority flow outlet 30.

Having described one specific preferred embodiment of the invention, the following is claimed:

1. A valve assembly comprising a valve body having an inlet passage adapted to be connected with a source of fluid under pressure, an excess flow outlet passage, and a priority flow outlet passage, a valve spool movable between a first condition restricting fluid flow from said inlet passage to said excess flow outlet passage and a second condition restricting fluid flow from said inlet passage to said priority flow outlet passage, first aperture means formed in said valve spool for porting fluid flow from said inlet passage to said priority flow outlet passage when said valve spool is in said first and second conditions, second aperture means formed in said valve spool at a location spaced from said first aperture means, said second aperture means being effective to port fluid flow from said inlet passage to said priority flow outlet passage when said valve spool is in said first condition, means cooperating with said valve spool for preventing fluid flow through said second aperture means when said valve spool is in said second condition, and means for effecting movement of said valve spool between said first and second conditions in response to variations in the fluid pressure at one of said outlet passages relative to the fluid pressure at the other outlet passage.

2. A valve assembly as set forth in claim 1 wherein said valve spool includes an annular land disposed between said first and second aperture means, said annular land being disposed in sealing engagement with said means for blocking flow through said second aperture means when said valve spool is in said second condition.

3. A valve assembly as set forth in claim 1 wherein said valve spool includes internal surface means for defining an axially extending passage connected in fluid communication with said first and second aperture means and said priority flow outlet passage.

4. A valve assembly as set forth in claim 1 wherein said second aperture means has a greater cross sectional area for conducting fluid flow than said first aperture means.

5. A valve assembly as set forth in claim 1 wherein said valve spool has first and second end portions, said means for effecting movement of said valve spool including surface means cooperating with said first end portion of said valve spool to define a first pressure chamber, passage means for connecting said pressure chamber in fluid communication with said inlet passage.

6. A valve assembly comprising a valve body having an inlet passage adapted to be connected with a source of fluid under pressure, an excess flow outlet passage, and a priority flow outlet passage, valve means for dividing a flow of fluid from said inlet passage between said excess flow outlet passage and said priority flow outlet passage, said valve means being operable between a first condition regulating the rate of fluid flow from said inlet passage to said priority flow outlet passage to a first predetermined flow rate and a second condition regulating the rate of fluid flow from said inlet passage to said priority flow outlet passage to a second predetermined flow rate which is less than said first predetermined flow rate, and means for effecting operation of said valve means between said first and second conditions in response to variations in fluid pressure at said priority flow outlet passage relative to the fluid pressure at said excess flow outlet passage, said valve means including first aperture means for porting a flow of fluid from said inlet passage to said priority flow outlet passage when said valve means is in said first and second conditions, second aperture means for porting a flow of fluid from said inlet passage to said priority flow outlet passage only when said valve means is in said first condition, said first and second aperture means being effective to port parallel fluid flows when said valve means is in said first condition.

7. A valve assembly as set forth in claim 6 further including means for effecting operation of said valve means in response to variations in the fluid pressure at one of said outlet passages relative to the fluid pressure at the other of said outlet passages to maintain the flow of fluid to said priority flow outlet passage substantially constant at said first predetermined flow rate when said valve means is in said second condition and to maintain the flow of fluid to said priority flow outlet passage substantially constant at said second predetermined flow rate when said valve means is in said second condition.

8. A valve assembly comprising a valve body having an inlet passage adapted to be connected with a source of fluid under pressure, an excess flow outlet passage, and a priority flow outlet passage, a valve spool movable between a first condition and a second condition, first aperture means providing communication between said inlet passage and said priority flow outlet passage when said valve spool is in said first and second conditions, means restricting flow from said inlet passage to said excess flow outlet passage when said valve spool is in said first condition and allowing flow between said inlet passage and said excess flow outlet passage when said valve spool is in said second condition, means to move said valve spool from said second condition to said first condition, second aperture means providing communication between said inlet passage and said priority flow outlet passage when said valve spool is in said first condition, means for blocking flow through said second aperture means when said valve spool is in said second condition said second aperture means providing a greater flow of fluid from said inlet passage to said priority flow outlet passage than said first aperture means, means to shift said valve spool toward said first condition from said second condition when the pressure of fluid in said priority flow outlet passage is greater than the pressure of fluid in said excess flow outlet passage, means to shift said valve spool toward said second condition from said first condition when said pressure of fluid in said excessive flow outlet passage is greater than said pressure of fluid in said priority flow outlet passage, and means to restrict the flow of fluid intermediate said first and second aperture means and said priority flow outlet passage when said valve spool approaches said second condition.

* * * * *